(12) United States Patent
Hamabe et al.

(10) Patent No.: US 11,503,167 B2
(45) Date of Patent: Nov. 15, 2022

(54) IMAGE PROCESSING APPARATUS, METHOD, AND COMPUTER PROGRAM PRODUCT EXCLUDES SPECIFIC ANOMALIES AMONG DETECTED ANOMALIES

(71) Applicant: KYOCERA Document Solutions Inc., Osaka (JP)

(72) Inventors: Rui Hamabe, Osaka (JP); Kazunori Tanaka, Osaka (JP); Kanako Morimoto, Osaka (JP); Takuya Miyamoto, Osaka (JP); Koji Sato, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/563,381

(22) Filed: Dec. 28, 2021

(65) Prior Publication Data

US 2022/0210277 A1    Jun. 30, 2022

(30) Foreign Application Priority Data

Dec. 28, 2020  (JP) .............................. JP2020-218475

(51) Int. Cl.
*H04N 1/00*     (2006.01)
*H04N 1/409*    (2006.01)

(52) U.S. Cl.
CPC ..... *H04N 1/00037* (2013.01); *H04N 1/00005* (2013.01); *H04N 1/00015* (2013.01); *H04N 1/00023* (2013.01); *H04N 1/00034* (2013.01); *H04N 1/00068* (2013.01); *H04N 1/00082* (2013.01); *H04N 1/4097* (2013.01)

(58) Field of Classification Search
CPC .......... H04N 1/00005; H04N 1/00015; H04N 1/00029; H04N 1/00034; H04N 1/00037; H04N 1/00039; H04N 1/00068; H04N 1/00082; H04N 1/0009; H04N 1/409; H04N 1/58; G06T 7/0002; G06T 2207/30144
See application file for complete search history.

(56) References Cited

U.S. PATENT DOCUMENTS

2020/0111199 A1* 4/2020 Ikeda ........................ G06T 7/11
2022/0084183 A1* 3/2022 Sakuyama ............. G01N 21/88
2022/0210278 A1* 6/2022 Hamabe ............. H04N 1/00082

FOREIGN PATENT DOCUMENTS

JP         2017-223892         12/2017
JP         2021111117 A    *   8/2021

* cited by examiner

*Primary Examiner* — Scott A Rogers
(74) *Attorney, Agent, or Firm* — Lex IP Meister, PLLC

(57) ABSTRACT

The image processing apparatus includes: an abnormality detection unit configured to detect one or more abnormalities included in a target image and an abnormality exclusion processing unit configured to exclude a specific abnormality from the detected one or more abnormalities. In a case in which a detection area of a certain abnormality among the detected one or more abnormalities and a detection area of another abnormality overlap with each other and a type of the certain abnormality and a type of the another abnormality are different from each other, when brightness information of one of the certain abnormality and the another abnormality satisfies a specific condition, the abnormality exclusion processing unit excludes the one of the certain abnormality and the another abnormality from the detected one or more abnormalities.

7 Claims, 6 Drawing Sheets

# IMAGE PROCESSING APPARATUS, METHOD, AND COMPUTER PROGRAM PRODUCT EXCLUDES SPECIFIC ANOMALIES AMONG DETECTED ANOMALIES

INCORPORATION BY REFERENCE

This application is based upon and claims the benefit of priority from the corresponding Japanese Patent Application No. 2020-218475 filed on Dec. 28, 2020, the entire contents of which are incorporated herein by reference.

BACKGROUND

The present disclosure relates to an image processing apparatus, an image processing method, and a non-transitory computer readable recording medium storing an image processing program.

An image processing apparatus detects, based on an image obtained by scanning a print product, an abnormality such as an unintended streak, dot, or unevenness occurring in the print product output by an image forming apparatus such as a multifunction peripheral or a printer, and estimates a cause of occurrence of each abnormality.

In general, in a case where an attempt is made to easily detect an abnormality, over detection occurs, and an image that is not abnormal may be detected as an abnormality. Although the above-described image processing apparatus can detect an abnormality, there is a possibility that an over detected abnormality (false abnormality) is included in a detection result. In addition, since post-stage processing such as estimation of the cause of occurrence is performed for such a false abnormality, extra calculation cost is required.

SUMMARY

An image processing apparatus according to the present disclosure includes an abnormality detection unit that detects one or more abnormalities included in a target image, and an abnormality exclusion processing unit that excludes a specific abnormality from the detected one or more abnormalities. In a case in which a detection area of a certain abnormality among the detected one or more abnormalities and a detection area of another abnormality among the detected one or more abnormalities overlap with each other and a type of the certain abnormality and a type of the another abnormality are different from each other, when brightness information of one of the certain abnormality and the another abnormality satisfies a specific condition, the abnormality exclusion processing unit excludes the one of the certain abnormality and the another abnormality from the detected one or more abnormalities.

An image processing method according to an embodiment of the present disclosure includes an abnormality detecting step of detecting one or more abnormalities included in a target image, and an abnormality exclusion step of excluding a specific abnormality from the detected one or more abnormalities. In the abnormality excluding step, when a detection area of a certain abnormality among the detected one or more abnormalities and a detection area of another abnormality among the detected one or more abnormalities overlap with each other and a type of the certain abnormality is different from a type of the another abnormality, when brightness information of one of the certain abnormality and the another abnormality satisfies a specific condition, the one of the certain abnormality and the another abnormality is excluded from the detected one or more abnormalities.

A non-transitory computer-readable recording medium according to an embodiment of the present disclosure stores an image processing program executable by a processor. The image processing program causes a processor to operate as the abnormality detection unit and the abnormality exclusion processing unit described above.

DETAILED DESCRIPTION OF THE INVENTION

Embodiments of the present disclosure will be described below with reference to the accompanying drawings.

Figure 1:
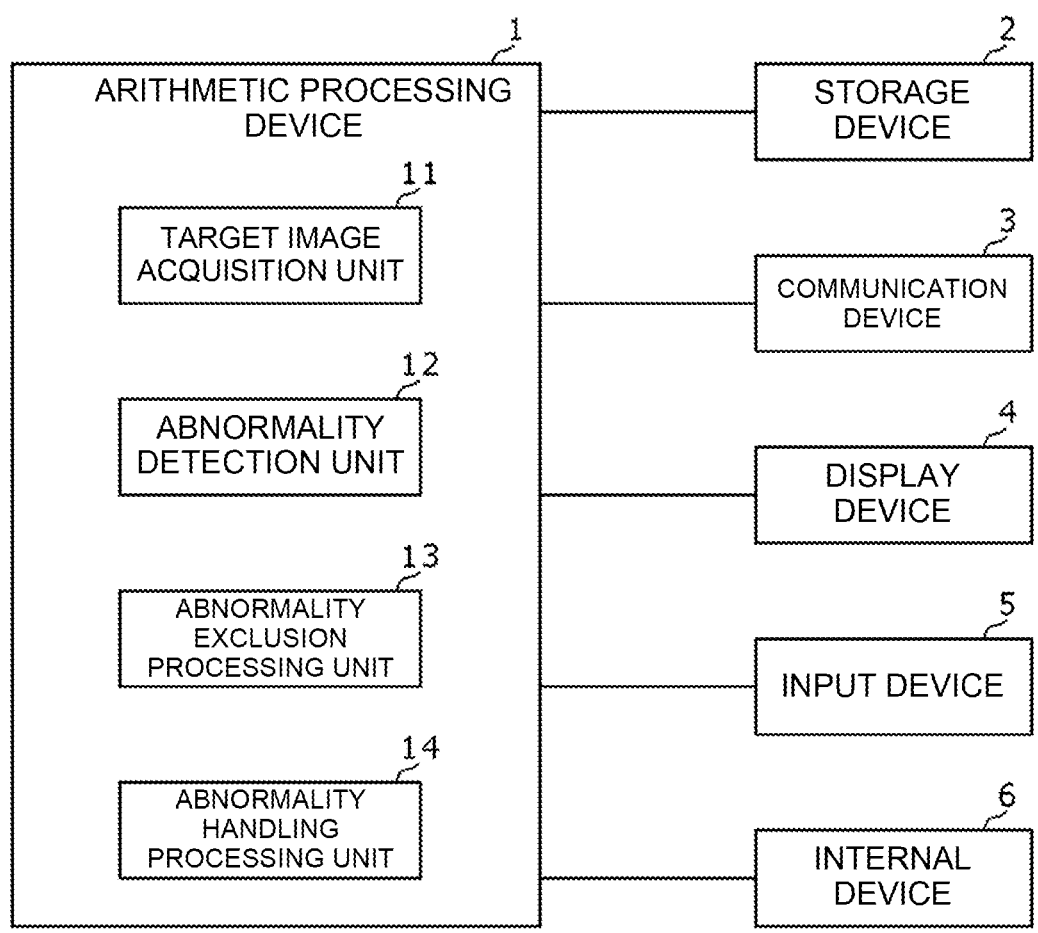
FIG. 1 is a block diagram illustrating a configuration of an image processing apparatus according to an embodiment of the present disclosure.

FIG. 1 is a block diagram illustrating a configuration of an image processing apparatus according to an embodiment of the present disclosure. The image processing apparatus illustrated in FIG. 1 is an information processing apparatus such as a personal computer or a server, or an electronic apparatus such as a digital camera or an image forming apparatus (a scanner or a multifunction peripheral), and includes an arithmetic processing device 1, a storage device 2, a communication device 3, a display device 4, an input device 5, and an internal device 6.

The arithmetic processing device 1 includes a computer, executes an image processing program on the computer, and operates as various processing units. To be specific, the computer includes a central processing unit (CPU), a read only memory (ROM), a random access memory (RAM), and the like, and operates as a specific processing unit by loading a program stored in the ROM or the storage device 2 into the RAM and executing the program by the CPU. In addition, the arithmetic processing device 1 may include an application specific integrated circuit (ASIC) that functions as a specific processing unit.

The storage device 2 is a nonvolatile storage device such as a flash memory. The storage device 2 stores an image processing program and data necessary for processing described below. For example, the image processing program is stored in a non-transitory computer-readable recording medium, and is installed in the storage device 2 from the recording medium.

The communication device 3 is a device that performs data communication with an external device, and is, for example, a network interface or a peripheral device interface. The display device 4 is a device that displays various kinds of information to a user, and is, for example, a display panel such as a liquid crystal display. The input device 5 is a device that detects a user operation, and is, for example, a keyboard, a touch panel, or the like.

The internal device 6 is a device that executes a function of the image processing apparatus. For example, when the image processing apparatus is an image forming apparatus, the internal device 6 is an image reading apparatus that optically reads a document image from a document, a printing apparatus that prints an image on a print sheet, or the like.

Here, the arithmetic processing device 1 operates as a target image acquisition unit 11, an abnormality detection unit 12, an abnormality exclusion processing unit 13, and an abnormality handling processing unit 14 as the processing units described above.

The target image acquisition unit 11 acquires a target image (image data) from the storage device 2, the communication device 3, the internal device 6, or the like, and stores the target image in the RAM or the like.

The abnormality detection unit 12 detects one or more abnormalities included in the acquired target image by an existing method. In this exemplary embodiment, the abnormality detection unit 12 detects one or more abnormalities with, for example, a filter (such as a secondary differential filter or a Gabor filter), and generates feature information of each of the one or more abnormalities. That is, the abnormalities are detected based on the feature amount (filter output) obtained by applying the filter to the input image.

The feature information includes a position and a size of an abnormality (a position and a size of a detection area to be described later), a type of the abnormality (a streak, a band, a point, or the like), and an abnormality degree corresponding to an output value of a filter at the time of detection of the abnormality. For example, when the density difference between the periphery of the abnormality and the abnormality is large, the abnormality degree increases.

Figure 2:
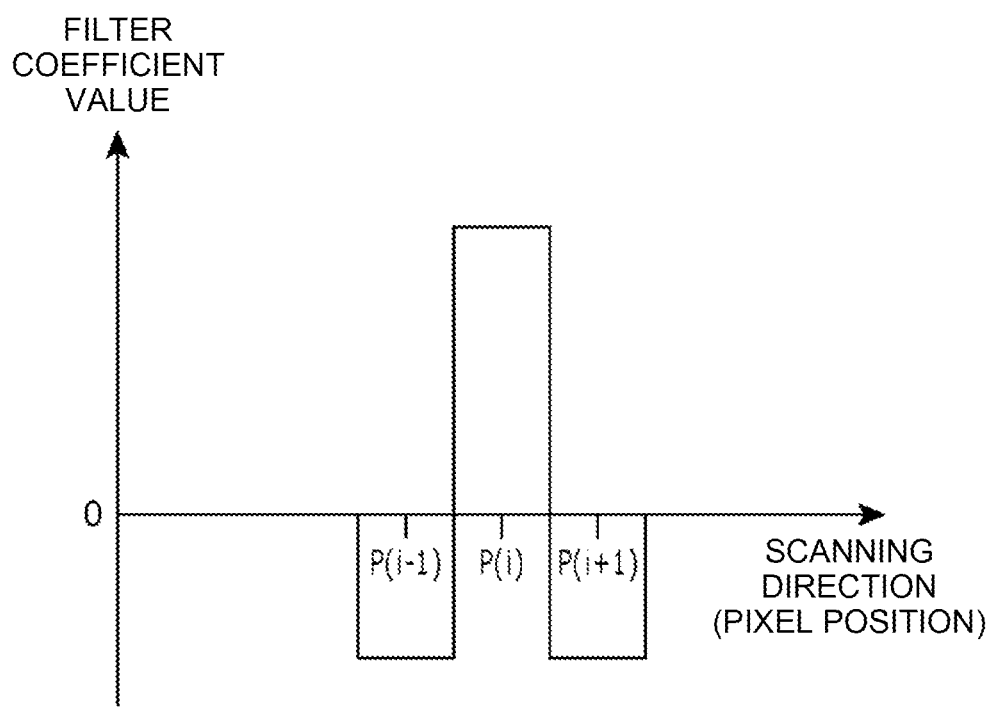
FIG. 2 is a diagram showing an example of a filter used in an abnormality detection unit 12 in FIG. 1.
Figure 3:
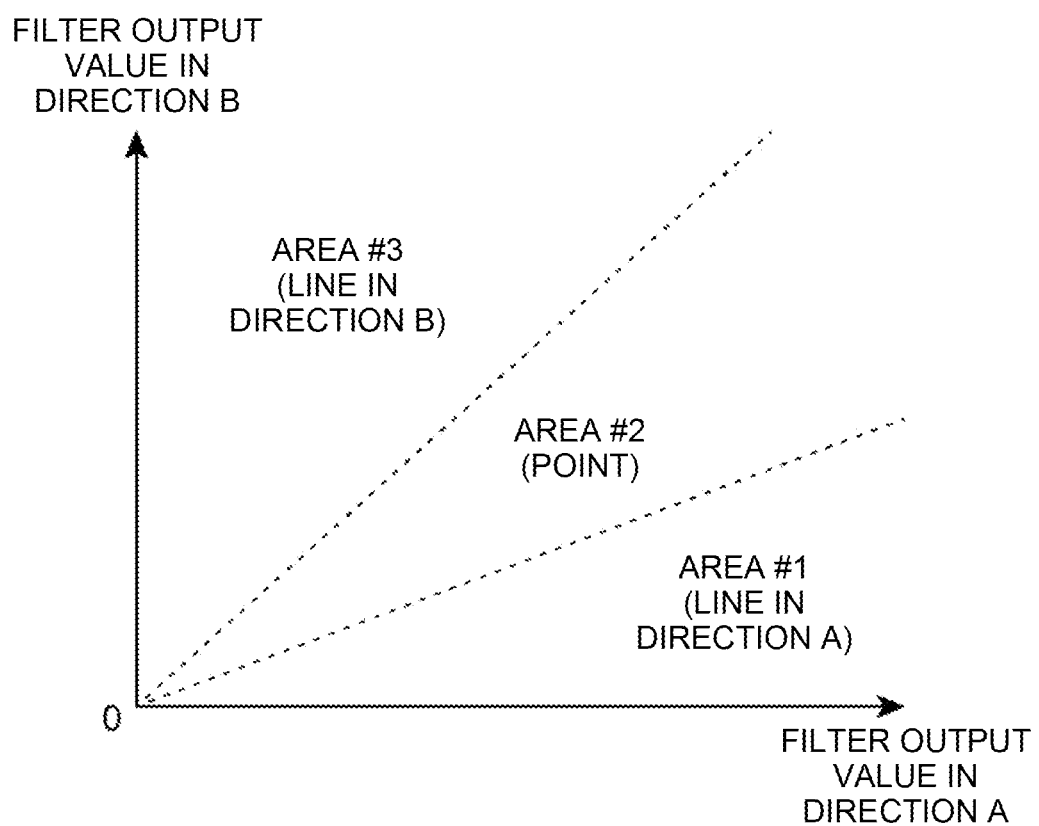
FIG. 3 is a diagram illustrating a correspondence relationship between filter output values of a plurality of filters used in the abnormality detection unit 12 in FIG. 1 and abnormality types.

FIG. 2 is a diagram showing an example of a filter used in the abnormality detection unit 12 in FIG. 1. FIG. 3 is a diagram illustrating a correspondence relationship between filter output values of a plurality of filters used in the abnormality detection unit 12 in FIG. 1 and abnormality types.

The abnormality detection unit 12 calculates a filter output value of each pixel P by moving a one dimensional secondary differential filter, for example as illustrated in FIG. 2, along a direction A and a direction B intersecting each other, classifies a shape pattern of an abnormality of the pixel into a line or a point based on a filter output value of each pixel P in the direction A and a filter output value of each pixel P in the direction B, and specifies feature information such as a type of the abnormality based on the shape pattern, for example as illustrated in FIG. 3. For example, when a shape pattern (a pair of substantially parallel lines) of an edge portion of a streak or a band is detected by a one-dimensional secondary differential filter as illustrated in FIG. 2, the type of abnormality is specified as a streak or a band.

The abnormality exclusion processing unit 13 excludes a specific abnormality from the detected one or more abnormalities. Specifically, in a case where the detection area of a certain abnormality among the detected one or more abnormalities and the detection area of another abnormality among the detected one or more abnormalities overlap each other and the type of the certain abnormality and the type of the another abnormality are different from each other, when the brightness information of one of the certain abnormality and the another abnormality satisfies a specific condition, the abnormality exclusion processing unit 13 excludes the one of the certain abnormality and the another abnormality from the detected one or more abnormalities.

The detection area is a rectangular area including an abnormality and is specified by the abnormality detection unit 12.

In this embodiment, one of the certain abnormality and the another abnormality is a point abnormality, and the other of the certain abnormality and the another abnormality is a streak abnormality (or a band abnormality). That is, among the detected one or more abnormalities, the abnormality exclusion process is performed to a point abnormality and a streak abnormality (band abnormality) that overlap each other among the detected one or more abnormalities.

In particular, the abnormality exclusion processing unit 13 derives a spatial brightness change distribution based on the brightness information, attempts to detect an area corresponding to an abnormality (here, a rectangular area circumscribing the abnormality in the detection area) based on the brightness change distribution, and in a case where (a) the detection result of the area satisfies the specific condition and (b) the type of the certain abnormality is different from the type of the another abnormality, one of the certain abnormality and the another abnormality is excluded from the detected one or more abnormalities.

In a case where the target image includes color information based on a specific color space (for example, RGB data based on an RGB color space), the abnormality exclusion processing unit 13 may determine, for each of color coordinates (for example, R coordinates, G coordinates, and B coordinates) of the color space, whether or not brightness information of one of the certain abnormality or the another abnormality at the color coordinates satisfies the specific condition, and exclude one of the certain abnormality or the another abnormality from the detected one or more abnormalities in a case where (a) the specific condition is established (in any of the color coordinates) and (b) the type of the certain abnormality and the type of the another abnormality are different from each other.

The abnormality handling processing unit 14 executes abnormality handling processing for the detected one or more abnormalities (other than the excluded abnormality). That is, the abnormality handling process is not executed for the excluded abnormality. The abnormality handling processing includes notification of each detected abnormality (notification to an operator who performs specification of a defective portion corresponding to the abnormality, maintenance, or the like, by message transmission by the communication device, message display by the display device 4, or the like), specification of a defective portion corresponding to each detected abnormality, a maintenance operation, and the like.

Figure 4:
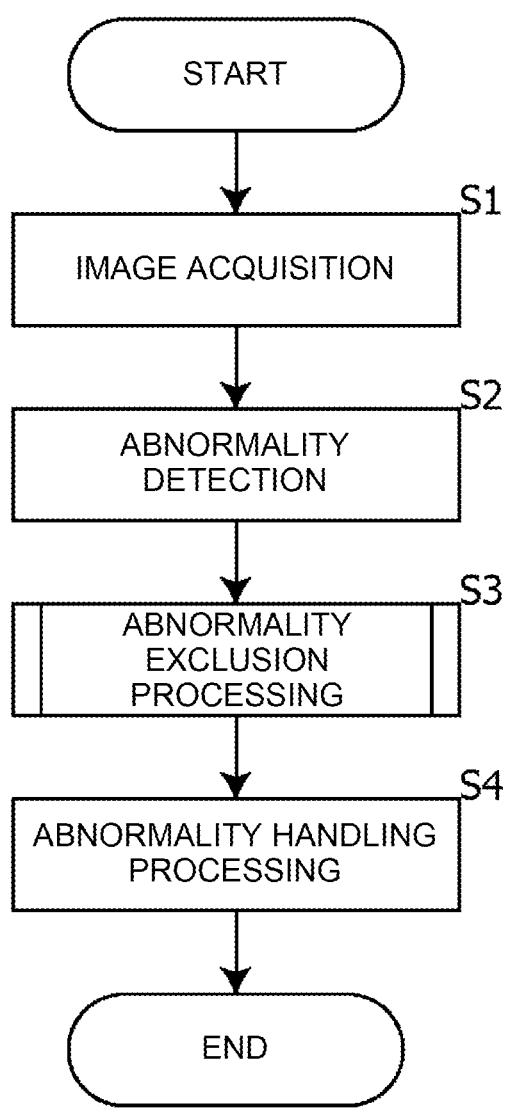
FIG. 4 is a flowchart illustrating an operation of the image processing apparatus illustrated in FIG. 1.

Next, the operation of the image processing apparatus shown in FIG. 1 will be described. FIG. 4 is a flowchart illustrating an operation of the image processing apparatus illustrated in FIG. 1.

First, the target image acquisition unit 11 acquires a target image (image date) (step S1). Next, the abnormality detection unit 12 detects an abnormality included in the acquired target image, generates feature information (position and size information, type, abnormality degree, and the like) of the detected abnormality, and stores the feature information in the RAM or the like (step S2).

Next, the abnormality exclusion processing unit 13 executes abnormality exclusion processing for excluding a specific abnormality from the detected one or more abnormalities (step S3).

The abnormality handling processing unit 14 executes an abnormality handling process for the detected one or more abnormalities (other than the excluded abnormality) (step S4).

Figure 5:
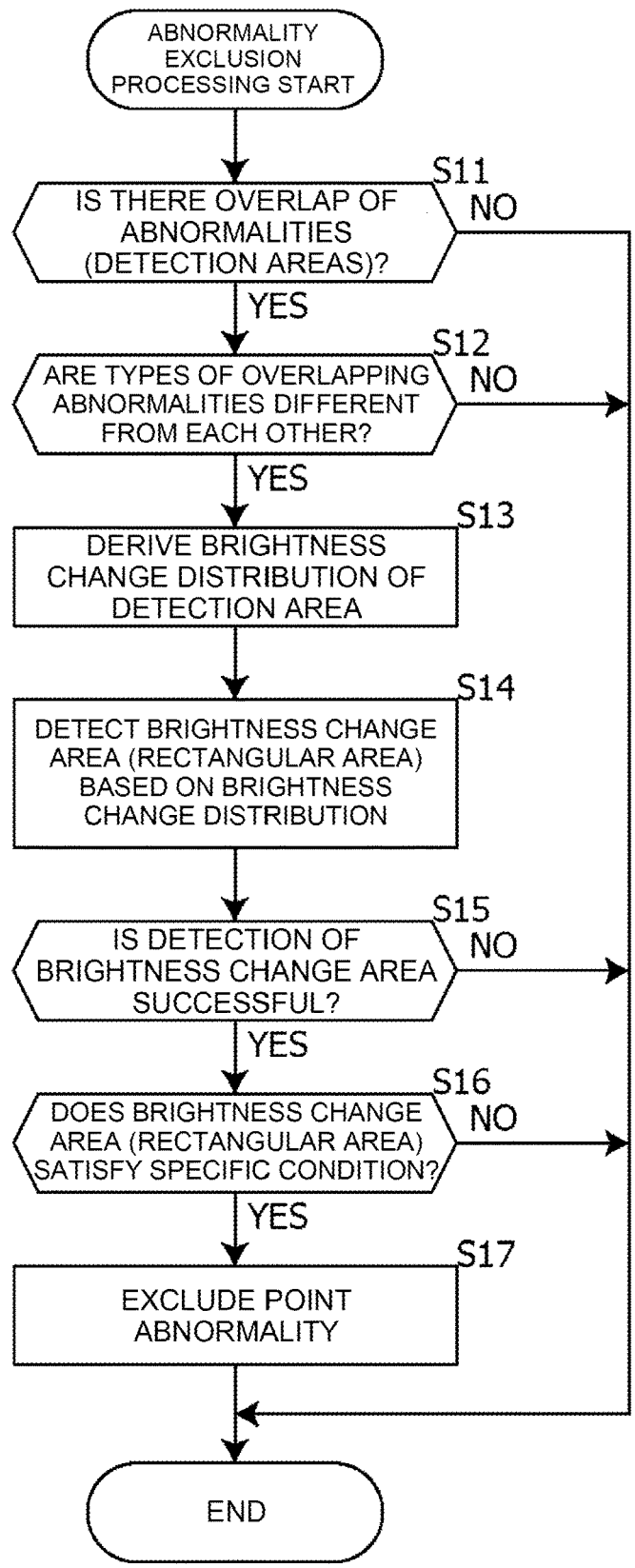
FIG. 5 is a flowchart illustrating the abnormality exclusion process (step S3) in FIG. 2.
Figure 6:
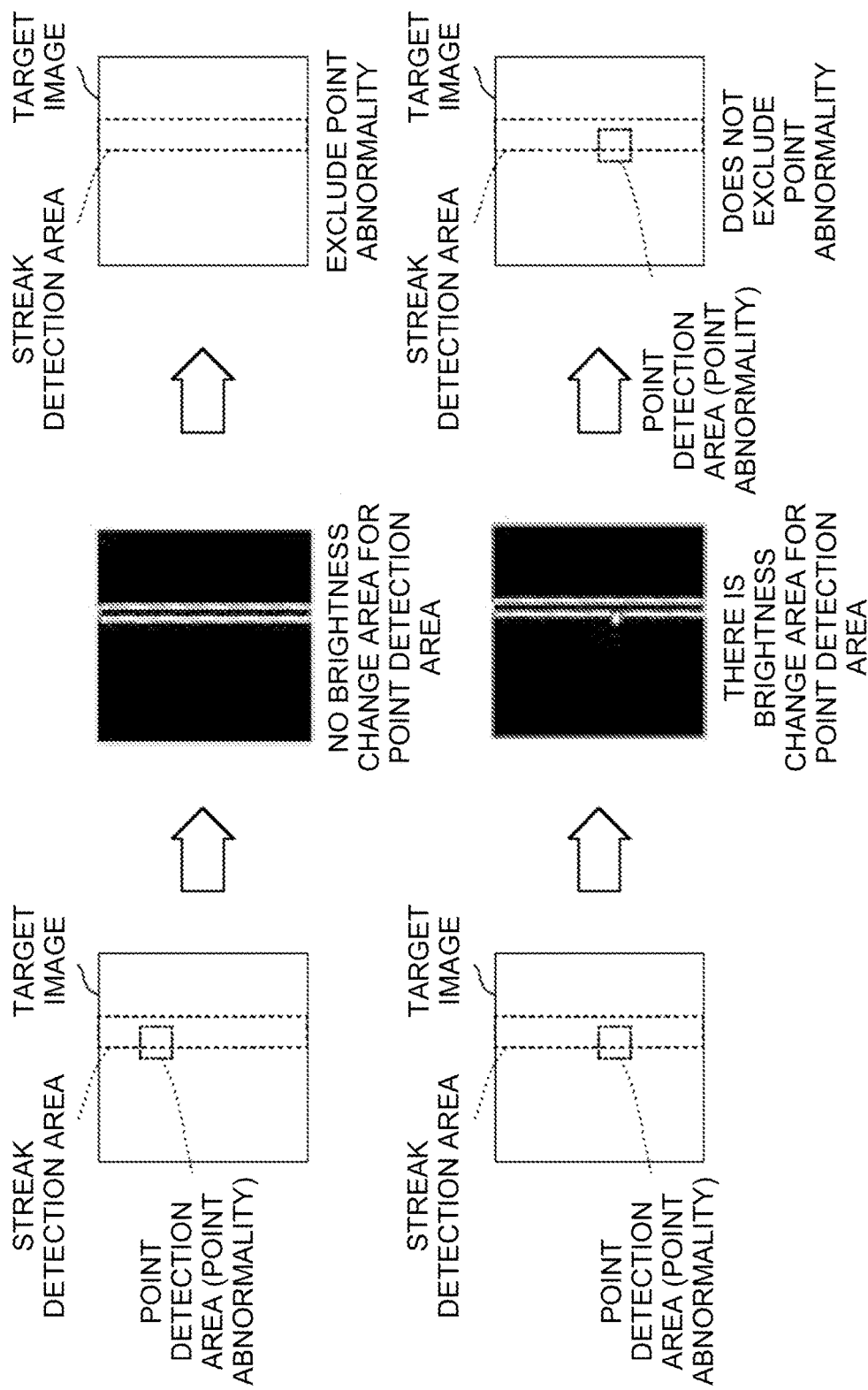
FIG. 6 is a diagram illustrating an example of the abnormality exclusion process (step S3) in FIG. 2.

Here, the abnormality exclusion process in step S3 will be described. FIG. 5 is a flowchart illustrating the abnormality exclusion process (step S3) in FIG. 2. FIG. 6 is a diagram illustrating an example of the abnormality exclusion process (step S3) in FIG. 2.

First, the abnormality exclusion processing unit 13 determines whether or not there is an overlap of abnormalities (detection areas) among the detected one or more abnormalities (step S11). More specifically, the abnormality exclusion processing unit 13 selects the detected one or more abnormalities in order, determines whether or not a part or all of the detection area of the selected abnormality overlaps the detection area of any other abnormality, based on the characteristic information described above, and thereby detects a set of two abnormalities (detection areas) with overlap.

When the set of two abnormalities (detection areas) with overlap is detected, the abnormality exclusion processing unit 13 determines whether or not the types of the two abnormalities with overlap are different from each another (step S12).

In a case where it is determined that the types of the two overlapping abnormalities are different from each other, the abnormality exclusion processing unit 13 derives a brightness change distribution of a detection area of at least a specific type of abnormality (here, point abnormality) among the two abnormalities (step S13).

Specifically, the abnormality exclusion processing unit 13 calculates the difference in pixel value (brightness value) between adjacent pixels in order in the detection area to derive the brightness change distribution.

Then, the abnormality exclusion processing unit 13 attempts to detect a brightness change area based on the brightness change distribution (step S14).

Specifically, the abnormality exclusion processing unit 13 specifies a position where the value (absolute value) of the difference is equal to or greater than a threshold in the brightness change distribution, determines that a portion surrounded by the position is abnormal, and specifies a circumscribed rectangle of the portion as the brightness change area.

Here, in a case where the abnormality exclusion processing unit 13 has successfully detected the brightness change area (step S15), the abnormality exclusion processing unit 13 determines whether or not the brightness change area satisfies a specific condition (step S16).

For example, the specific condition is that the area or aspect ratio of the brightness change area (rectangular area) is lower than the threshold.

Then, when the brightness change area satisfies the specific condition, the abnormality exclusion processing unit 13 excludes a corresponding abnormality (here, a point abnormality) (step S17).

In this manner, the specific abnormality is excluded from the detected one or more abnormalities. Note that, in a case where overlapping of different types of abnormalities is not detected in steps S11 and S12, in a case where it is determined in step S15 that the brightness change area is not successfully detected, and in a case where it is determined in step S16 that the brightness change area does not satisfy the specific condition, the above-described exclusion of an abnormality is not performed.

For example, as shown in FIG. 6, for the point abnormality and the streak abnormality overlapping each other, in a case where the brightness change area is detected in the detection area corresponding to the point abnormality, the point abnormality is not excluded, but in a case where the brightness change area is not detected in the detection area corresponding to the point abnormality, the point abnormality is excluded.

As described above, according to the above embodiment, the abnormality detection unit 12 detects an abnormality included in a target image, and the abnormality exclusion processing unit 13 excludes a specific abnormality from the detected one or more abnormalities. Then, in a case where the detection area of a certain abnormality among the detected one or more abnormalities and the detection area of another abnormality among the detected one or more abnormalities overlap each other and the type of the certain abnormality and the type of the another abnormality are different from each other, when the brightness information of one of the certain abnormality and the another abnormality satisfies the specific condition, the abnormality exclusion processing unit 13 excludes the one of the certain abnormality and the another abnormality from the detected abnormalities.

Accordingly, the false abnormality is excluded from the detected one or more abnormalities, and the accuracy of detecting abnormalities improves. The calculation cost and the processing time required for the abnormality handling process are reduced, too.

Various changes and modifications to the above-described embodiments will be apparent to those skilled in the art. Such changes and modifications may be made without departing from the spirit and scope of the subject matter and without diminishing its intended advantages. That is, such changes and modifications are intended to be included in the scope of claims.

What is claimed is:

1. An image processing apparatus comprising:
an abnormality detection unit that detects one or more abnormalities included in a target image; and
an abnormality exclusion processing unit that excludes a specific abnormality from the detected one or more abnormalities,
wherein, in a case in which a detection area of a certain abnormality among the detected one or more abnormalities and a detection area of another abnormality among the detected one or more abnormalities overlap with each other and a type of the certain abnormality and a type of the another abnormality are different from each other, when brightness information of one of the certain abnormality and the another abnormality satisfies a specific condition, the abnormality exclusion processing unit excludes the one of the certain abnormality and the another abnormality from the detected one or more abnormalities.

2. The image processing apparatus according to claim 1, wherein the abnormality exclusion processing unit
derives a spatial brightness change distribution based on the brightness information,
attempts to detect an area corresponding to the abnormality based on the brightness change distribution, and
in a case where (a) a detection result of the area satisfies the specific condition and (b) a type of the certain abnormality and a type of the another abnormality are different from each other, excludes one of the certain abnormality and the another abnormality from the detected one or more abnormalities.

3. The image processing apparatus according to claim 1, wherein the target image includes color information based on a specific color space, and
the abnormality exclusion processing unit determines, for each color coordinate of the color space, whether or not the brightness information at the color coordinates of one of the certain abnormality and the another abnormality satisfies the specific condition, and in a case where (a) the specific condition is established and (b) the type of the certain abnormality and the type of the another abnormality are different from each other, the abnormality exclusion processing unit excludes the one of the certain abnormality and the another abnormality from the detected one or more abnormalities.

4. The image processing apparatus according to claim 1, wherein one of the type of the certain abnormality and the type of the another abnormality is a point abnormality.

5. The image processing apparatus according to claim 1, the abnormality detection unit detects an abnormality using a filter and generates feature information of the detected abnormality, and the feature information includes a type of the abnormality.

6. An image processing method comprising:
an abnormality detecting step of detecting one or more abnormalities included in a target image; and
an abnormality excluding step of excluding a specific abnormality from the detected one or more abnormalities, wherein in the abnormality excluding step, in a case where a detection area of a certain abnormality among the detected one or more abnormalities and a detection area of another abnormality among the detected one or more abnormalities overlap with each other and a type of the certain abnormality is different from a type of the another abnormality, when brightness information of one of the certain abnormality and the another abnormality satisfies a specific condition, the one of the certain abnormality and the another abnormality is excluded from the detected one or more abnormalities.

7. A non-transitory computer-readable recording medium storing an image processing program executable by a processor, the image processing program causing the processor to operate as:
an abnormality detection unit that detects one or more abnormalities included in a target image; and
an abnormality exclusion processing unit that excludes a specific abnormality from the detected one or more abnormalities,
wherein, in a case in which a detection area of a certain abnormality among the detected one or more abnormalities and a detection area of another abnormality among the detected one or more abnormalities overlap with each other and a type of the certain abnormality and a type of the another abnormality are different from each other, when brightness information of one of the certain abnormality and the another abnormality satisfies a specific condition, the abnormality exclusion processing unit excludes the one of the certain abnormality and the another abnormality from the detected one or more abnormalities.

* * * * *